US010289335B2

(12) United States Patent
Asmussen et al.

(10) Patent No.: US 10,289,335 B2
(45) Date of Patent: May 14, 2019

(54) TAPE DRIVE LIBRARY INTEGRATED MEMORY DEDUPLICATION

(71) Applicant: INTERNATIONAL BUSINESS MACHINES CORPORATION, Armonk, NY (US)

(72) Inventors: Ole Asmussen, Henstedt-Ulzburg (DE); Robert Beiderbeck, Wassenberg (DE); Erik Rueger, Ockenheim (DE); Markus Schäfer, Heiligenmoschel (DE)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/702,158

(22) Filed: Sep. 12, 2017

(65) Prior Publication Data

US 2019/0079690 A1    Mar. 14, 2019

(51) Int. Cl.
*G06F 3/06* (2006.01)
*G06F 11/14* (2006.01)

(52) U.S. Cl.
CPC .......... *G06F 3/0641* (2013.01); *G06F 3/0608* (2013.01); *G06F 3/0686* (2013.01); *G06F 11/1451* (2013.01); *G06F 11/1469* (2013.01); *G06F 2201/805* (2013.01); *G06F 2201/82* (2013.01)

(58) Field of Classification Search
CPC .... G06F 3/0641; G06F 3/0608; G06F 3/0686; G06F 11/1451; G06F 11/1469; G06F 2201/805; G06F 2201/82

USPC ................................ 714/747, 718, 771, 769
See application file for complete search history.

(56) References Cited

U.S. PATENT DOCUMENTS

| 8,311,964 | B1 * | 11/2012 | Efstathopoulos | G06F 3/0608 706/45 |
| 8,667,235 | B2 * | 3/2014 | Williams | G11B 5/09 711/133 |
| 8,682,868 | B2 * | 3/2014 | Ghuge | G06F 17/3015 707/692 |

(Continued)

OTHER PUBLICATIONS

Friedman, Mark J.; Updated List of IBM Patents or Patent Applications Treated as Related; May 25, 2018; 1 page.

(Continued)

*Primary Examiner* — John T Tabone, Jr.
(74) *Attorney, Agent, or Firm* — Schmeiser, Olsen & Watts; Mark C. Vallone

(57) ABSTRACT

A method and system for improving tape drive memory storage is provided. The method includes receiving, by a storage tape drive hardware device, a data stream. Duplicate data chunks of the data stream are identified and deleted such that a group of data chunks remain in a non-volatile memory device (NVS2) of the storage tape drive. The group of data chunks is written to a data storage tape cartridge. Pointers are generated and stored within the data storage tape cartridge. The pointers are associated with a location within an NVS1 for storing de-duplication hashes identifying each data chunk of the group of data chunks stored within data storage tape cartridge. The de-duplication hashes are written by from the NVS1 to a manager non-volatile memory device (MNVS) of a storage tape drive hardware library system. The MNVS is updated.

20 Claims, 18 Drawing Sheets

(56) References Cited

U.S. PATENT DOCUMENTS

| | | | | |
|---|---|---|---|---|
| 8,694,703 | B2* | 4/2014 | Hans | G06F 3/0613 |
| | | | | 707/797 |
| 8,849,955 | B2* | 9/2014 | Prahlad | G06F 17/302 |
| | | | | 709/211 |
| 9,401,967 | B2* | 7/2016 | Sabaa | H04L 67/2842 |
| 9,417,811 | B2* | 8/2016 | Fiske | G06F 3/0641 |
| 9,514,146 | B1 | 12/2016 | Wallace et al. | |
| 2012/0047328 | A1* | 2/2012 | Williams | G11B 5/09 |
| | | | | 711/118 |
| 2012/0131025 | A1* | 5/2012 | Cheung | G06F 17/30082 |
| | | | | 707/755 |
| 2013/0144845 | A1* | 6/2013 | Ghuge | G06F 17/3015 |
| | | | | 707/692 |
| 2013/0238876 | A1* | 9/2013 | Fiske | G06F 3/0641 |
| | | | | 711/216 |
| 2014/0052907 | A1 | 2/2014 | Starr | |
| 2014/0114934 | A1* | 4/2014 | Chakraborty | G06F 3/0608 |
| | | | | 707/692 |
| 2014/0340778 | A1 | 11/2014 | Hana et al. | |
| 2015/0012503 | A1* | 1/2015 | Akirav | G06F 17/30156 |
| | | | | 707/692 |
| 2015/0317083 | A1* | 11/2015 | Phan | G06F 3/0608 |
| | | | | 711/103 |
| 2016/0078068 | A1* | 3/2016 | Agrawal | G06F 17/30303 |
| | | | | 707/692 |
| 2016/0246537 | A1* | 8/2016 | Kim | G06F 11/108 |
| 2017/0255525 | A1* | 9/2017 | Dain | G06F 11/1453 |
| 2017/0286233 | A1* | 10/2017 | Dain | G06F 11/1453 |

OTHER PUBLICATIONS

Friedman, Mark J.; List of IBM Patents or Patent Applications Treated as Related; Sep. 12, 2017; 1 page.

* cited by examiner

TAPE DRIVE LIBRARY INTEGRATED MEMORY DEDUPLICATION

FIELD

The present invention relates generally to a method for efficiently de-duplicating data stored on a tape drive and in particular to a method and associated system for optimizing a de-duplication process within a tape library.

BACKGROUND

Processes for implementing a data deduplication environment are well known. A typical data deduplication environment for random accessible storage systems such as disk drives and flash memory typically includes a data chunk database including information identifying data chunks and associated metadata. A large number of solutions currently exist with respect to de-duplicating data stored on disk drives and flash memory as the aforementioned memory structures allow a process for de-duplicating data to be performed at any time as the data may be accessed without any delay. In tape storage environments data is usually written once in a sequential manner that includes a read delay due to a positioning of a tape to with respect to a read/write head. A large number of solutions currently exist with respect to de-duplicating data in multiple storage media However, the aforementioned solutions may be associated with tape drive storage limitations and speed issues thereby limiting a performance of de-duplication systems. Additionally, the aforementioned solutions may not be enabled to allow for tape drive data compression without the use of a learning curve.

Accordingly, there exists a need in the art to provide a process for compressing data via a de-duplication method executed within a tape drive library.

SUMMARY

A first aspect of the invention provides a tape drive memory storage improvement method comprising: receiving, by a processor of a storage tape drive hardware device of a storage tape drive hardware library system comprising a plurality of storage tape drive hardware devices, a data stream for storage, wherein the storage tape drive hardware device internally comprises a deduplication software engine, a non-volatile memory device (NVS1), a non-volatile memory device (NVS2), and a first data storage tape cartridge; identifying, by the processor within the NVS2, duplicate data chunks of a plurality of adjacent variable length data chunks of the data stream, wherein the duplicate data chunks comprise duplicated data with respect to a first group of data chunks of the plurality of adjacent variable length data chunks; deleting, by the processor from the NVS2, the duplicate data chunks such that the first group of data chunks remain within the NVS2; writing, by the processor to a first data storage tape cartridge of the storage tape drive hardware device, the first group of data chunks; generating, by the processor, pointers associated with a location within the NVS1 storing de-duplication hashes identifying each data chunk of the first group of data chunks stored within first data storage tape cartridge; storing, by the processor, the pointers within the first data storage tape cartridge; writing, by the processor from the first NVS1 to a manager non-volatile memory device (MNVS) of the storage tape drive hardware library system, the de-duplication hashes; and updating, by the processor, the MNVS by combining the de-duplication hashes with a plurality of additional de-duplication hashes identifying a plurality of commonly used de-duplicated data chunks stored within the plurality of storage tape drive hardware devices.

A second aspect of the invention provides a A computer program product, comprising a computer readable hardware storage device storing a computer readable program code, the computer readable program code comprising an algorithm that when executed by a processor of a storage tape drive hardware device implements a tape drive memory storage improvement method, the method comprising: receiving, by the processor, a data stream for storage, wherein the storage tape drive hardware device is comprised by a storage tape drive hardware library system comprising a plurality of storage tape drive hardware devices, and wherein the storage tape drive hardware device internally comprises a deduplication software engine, a non-volatile memory device (NVS1), a non-volatile memory device (NVS2), and a first data storage tape cartridge; identifying, by the processor within the NVS2, duplicate data chunks of a plurality of adjacent variable length data chunks of the data stream, wherein the duplicate data chunks comprise duplicated data with respect to a first group of data chunks of the plurality of adjacent variable length data chunks; deleting, by the processor from the NVS2, the duplicate data chunks such that the first group of data chunks remain within the NVS2; writing, by the processor to a first data storage tape cartridge of the storage tape drive hardware device, the first group of data chunks; generating, by the processor, pointers associated with a location within the NVS1 storing de-duplication hashes identifying each data chunk of the first group of data chunks stored within first data storage tape cartridge; storing, by the processor, the pointers within the first data storage tape cartridge; writing, by the processor from the first NVS1 to a manager non-volatile memory device (MNVS) of the storage tape drive hardware library system, the de-duplication hashes; and updating, by the processor, the MNVS by combining the de-duplication hashes with a plurality of additional de-duplication hashes identifying a plurality of commonly used de-duplicated data chunks stored within the plurality of storage tape drive hardware devices.

A third aspect of the invention provides a storage tape drive hardware device comprising a processor coupled to a computer-readable memory unit, the memory unit comprising instructions that when executed by the processor implements a tape drive memory storage improvement method comprising: receiving, by the processor, a data stream for storage, wherein the storage tape drive hardware device is comprised by a storage tape drive hardware library system comprising a plurality of storage tape drive hardware devices, and wherein the storage tape drive hardware device internally comprises a deduplication software engine, a non-volatile memory device (NVS1), a non-volatile memory device (NVS2), and a first data storage tape cartridge; identifying, by the processor within the NVS2, duplicate data chunks of a plurality of adjacent variable length data chunks of the data stream, wherein the duplicate data chunks comprise duplicated data with respect to a first group of data chunks of the plurality of adjacent variable length data chunks; deleting, by the processor from the NVS2, the duplicate data chunks such that the first group of data chunks remain within the NVS2; writing, by the processor to a first data storage tape cartridge of the storage tape drive hardware device, the first group of data chunks; generating, by the processor, pointers associated with a location within the NVS1 storing de-duplication hashes identifying each data chunk of the first group of data chunks stored within first data storage tape cartridge; storing, by the processor, the pointers within the first data storage tape cartridge; writing, by the processor from the first NVS1 to a manager non-volatile memory device (MNVS) of the storage tape drive hardware library system, the de-duplication hashes; and updating, by the processor, the MNVS by combining the de-duplication hashes with a plurality of additional de-duplication hashes identifying a plurality of commonly used de-duplicated data chunks stored within the plurality of storage tape drive hardware devices.

The present invention advantageously provides a simple method and associated system capable of implementing a data deduplication environment.

DETAILED DESCRIPTION

Figure 1:
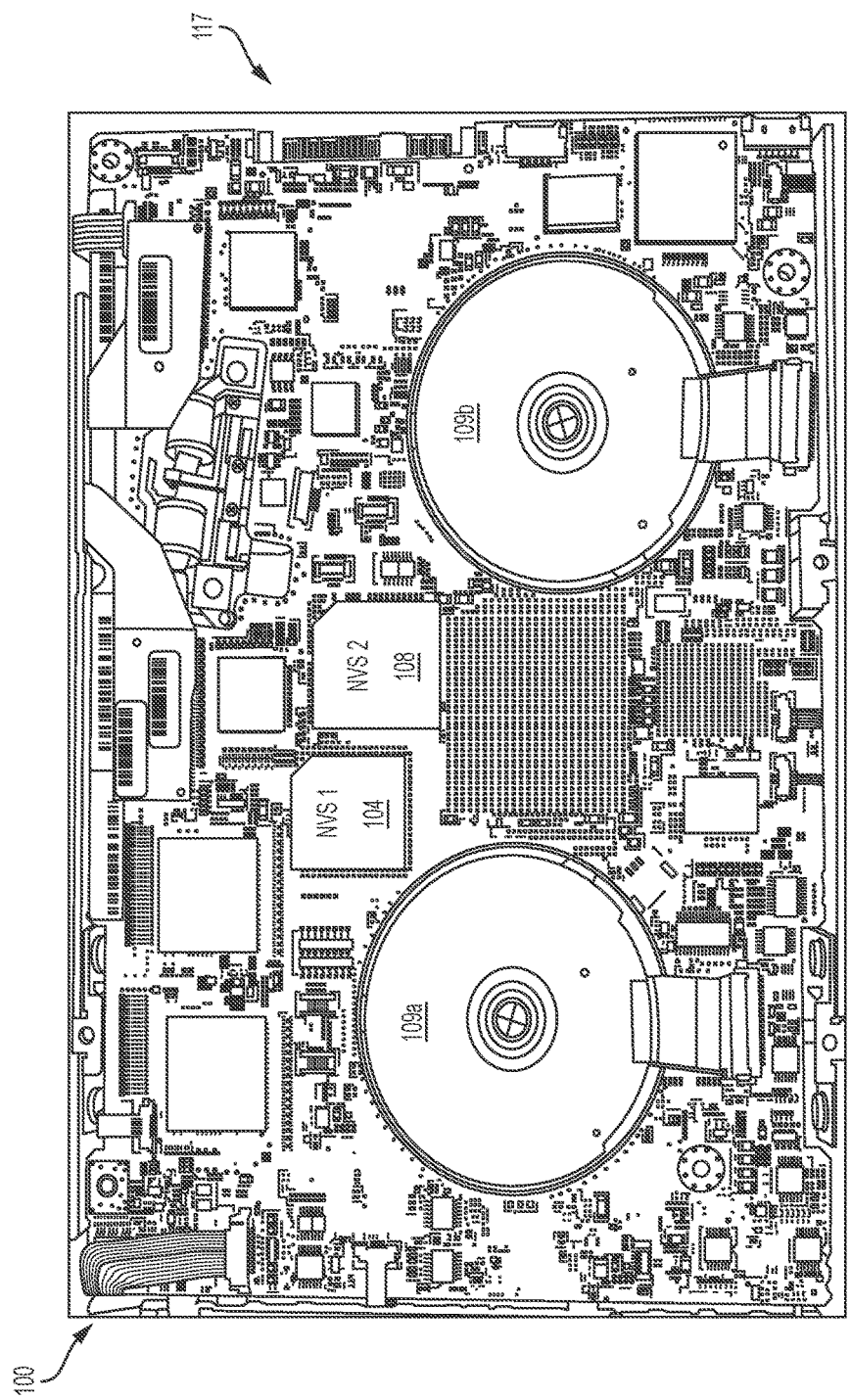
FIG. 1 illustrates a storage tape drive hardware device for improving a tape drive memory storage process, in accordance with embodiments of the present invention.

FIG. 1 illustrates a storage tape drive hardware device 100 for improving a tape drive memory storage process, in accordance with embodiments of the present invention. Typical de-duplication processes are usually associated with random accessible storage systems such as disk drives and flash memory devices. The de-duplication processes are typically applied to the aforementioned memory storage systems due to the ability of a de-duplication process to be performed at any time and data is able to be accessed without any delay. Executing a de-duplication process with respect to data stored on a tape drive storage device may result in tape drive storage limitations and speed issues. The aforementioned tape drive de-duplication process may cause de-duplication system performance issues thereby causing storage delays.

Data deduplication is defined herein as a specialized data compression technique for eliminating duplicate copies of repeating data portions (or chunks) from a data stream. A data de-duplication process is used to improve (tape drive device) memory storage utilization. A de-duplication process identifies and stores unique chunks of data or byte patterns during an analysis process. During the analysis process, additional data chunks are compared to the stored data chunks and whenever a match occurs, a duplicate (redundant) data chunk is replaced with a pointer (reference) that points to a location for the stored data chunk.

Storage tape drive hardware device 100 enables a mechanism for compressing data via a deduplication process executed directly within storage tape drive hardware device 100 without the need of a host or data management system. Storage tape drive hardware device 100 integrates a deduplication module internally comprising additional deduplication memory devices (i.e., non-volatile memory device 104 and non-volatile memory device 108) to temporary store deduplicated data chunks linked to reference pointers. During each data write execution, a deduplication software engine removes deduplicated data chunks from a data stream and replaces them with a pointer to the deduplication memory devices and when a data storage tape cartridge is full or is removed from storage tape drive hardware device 100, data content of the deduplication memory device is written to a reserved position of the data storage tape cartridge. Therefore, the data storage tape cartridge contains compressed data (i.e., data without the data chunks identified as duplicates) and all data from the deduplication memory device. When a data storage tape cartridge is mounted to storage tape drive hardware device 100, all detected reserved portions (of the data storage tape cartridge) are read thereby filling the deduplication memory device. Therefore, a data read process may be performed by reading compressed data and decoding the compressed data by replacing an associated pointer with data from the deduplication memory device.

Storage tape drive hardware device 100 of FIG. 1 includes a non-volatile memory device (NVS1) 104, a non-volatile memory device (NVS2) 108, tape drive motors 109a and 109b, and control circuitry 117 including a deduplication software engine for controlling all functionality associated with storage tape drive hardware device 100. NVS1 and NVS2 may comprise any type of specialized memory devices including, inter alia, an integrated circuit based memory device, a removable flash memory device, etc. Storage tape drive hardware device 100 may comprise an embedded computer or any type of specialized embedded hardware device. An embedded computer is defined herein as a dedicated computer comprising a combination of computer hardware and software (fixed in capability or programmable) specifically designed for executing a specialized function. Programmable embedded computers may comprise specialized programming interfaces. Additionally, storage tape drive hardware device 100 may comprise a specialized hardware device comprising specialized (non-generic) hardware and circuitry (i.e., specialized discrete non-generic analog, digital, and logic based circuitry) for executing a process described with respect to FIGS. 1-8. The specialized discrete non-generic analog, digital, and logic based circuitry may include proprietary specially designed components (e.g., a specialized integrated circuit designed for only implementing an automated process for improving tape drive memory storage process). Storage tape drive hardware device 100 of FIG. 1 includes specialized memory devices NVS1 104 and NVS2 108. The specialized memory may include a single memory system. Alternatively, the specialized memory may include a plurality of memory systems. Storage tape drive hardware device 100 may include sensors, processors, and additional software and specialized circuitry. Sensors may include, inter alia, storage sensors, optical sensors, speed sensors, etc.

Storage tape drive hardware device 100 enables a process for storing/buffering data sets within NVS2 108 prior to being written to a data storage tape cartridge such that during a data write process the stored/buffered data sets are analyzed by diving the datasets into larger segments such that each data segment comprises a collection of adjacent variable-length data chunks derived via execution of a chunking algorithm. The analyzed data segments are used to create a chunk-list file and compute one or more similarity identifiers for storage within an index. The chunk list file (i.e., a temporary repository) is stored within NVS1 104. During a process for directly streaming the contents of NVS2 108 to a (physical) data storage tape cartridge, storage tape drive hardware device 100 executes a process for the building chunk list file and initiates a counting process to determine matching data chunks located within a first few hundred mega bytes of data. The counting process is executed util a specified threshold is reached and all further identical data chunks are deleted from NVS2 108. Additionally, position pointers (i.e., pointing to a position within data storage tape cartridge) are written to NVS1 104. All data chinks deleted from NVS2 108 are written to data storage tape cartridge thereby improving the memory via a space saving process.

Figure 2:
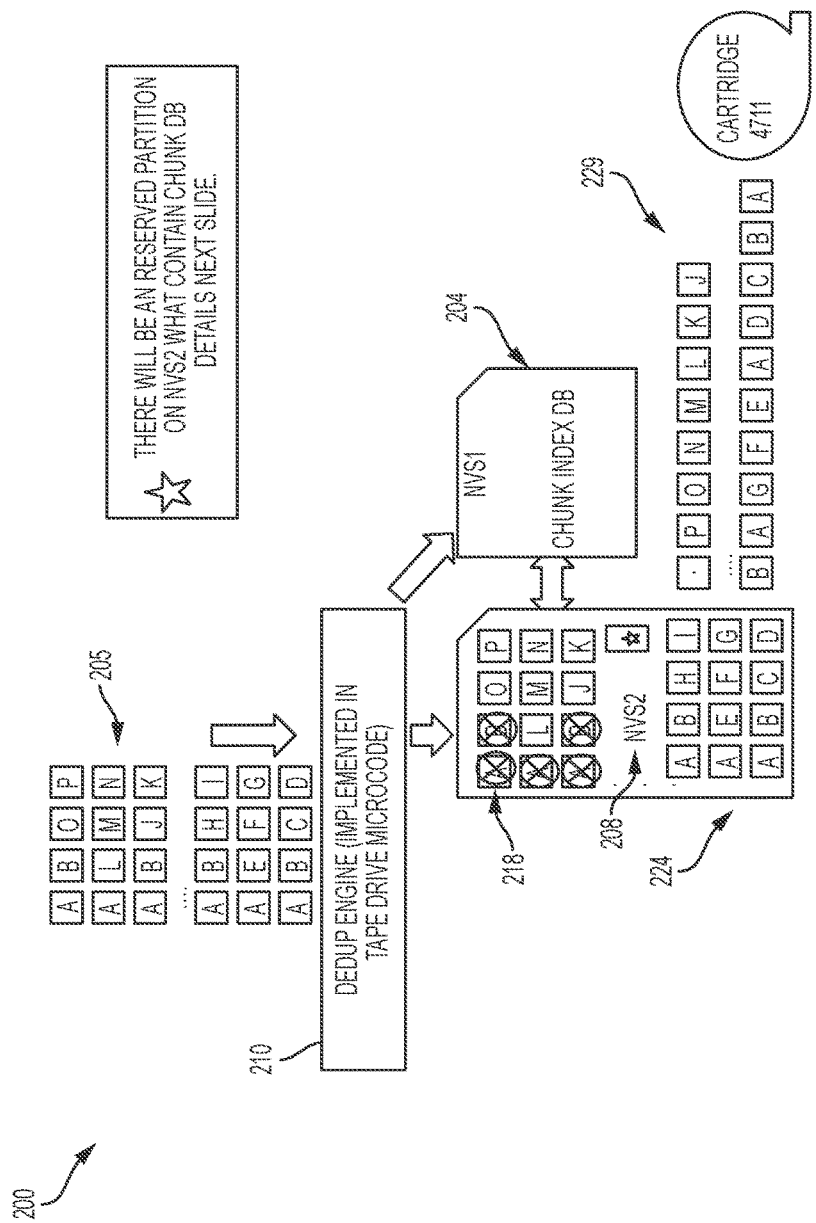
FIG. 2 illustrates a process for deduplicating and writing data via internal non-volatile memory devices, in accordance with embodiments of the present invention.

FIG. 2 illustrates a process 200 for deduplicating and writing data via NVS1 204 and NVS2 208, in accordance with embodiments of the present invention. Process 200 illustrates a data stream 205 received from a data host device. Data stream 205 is processed (within NVS2 208) by a deduplication software engine 210 (comprising software microcode) resulting in the deletion of data chunks "A" and "B" from NVS2 208. Additionally, a position pointer associated with the remaining data chunks 218 (being stored within tape cartridge 4711) is stored within a chunk index database within NVS1 204. A subsequent analysis is performed to analyze the incoming data stream 224 until a specified number (i.e., a threshold) of duplicate data chunks are identified. For example (with respect to FIG. 2), data chunk "A" has been identified three times and data chunk "B" has been identified two times. All remaining data chunks 229 are written to tape cartridge 4711.

Figure 3:
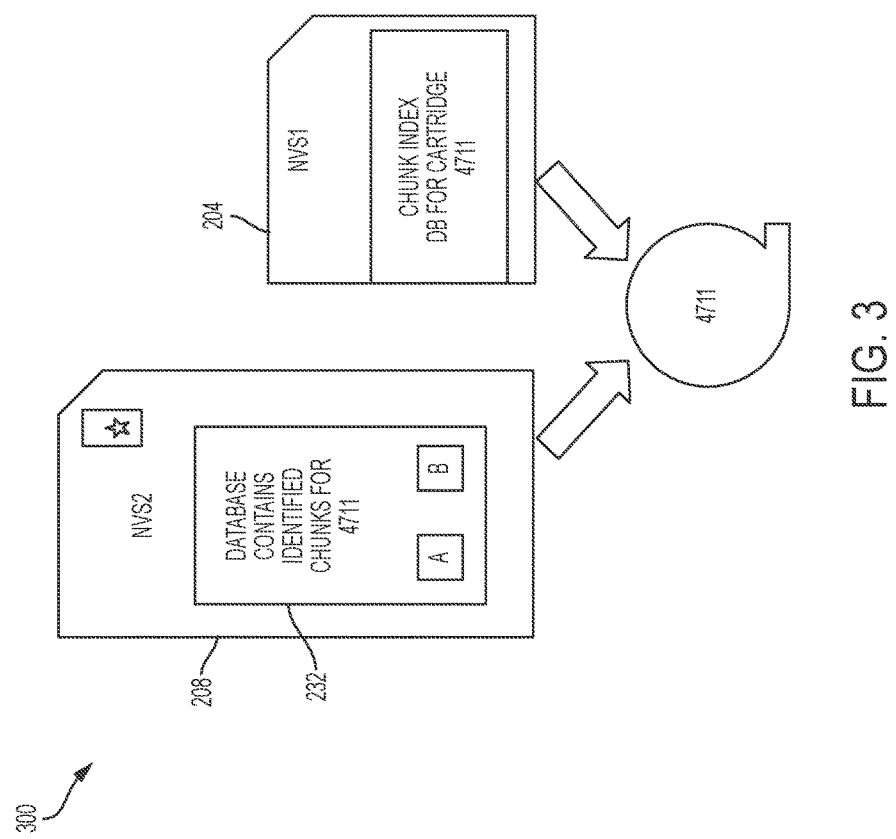
FIG. 3 illustrates a further process with respect to the process of FIG. 2, in accordance with embodiments of the present invention.

FIG. 3 illustrates a further process 300 with respect to process 200 of FIG. 2, in accordance with embodiments of the present invention. Process 300 illustrates a reserve partition 232 within NVS2. Reserve partition 232 includes a database comprising all identified duplicate data chunks "A" and "B" (i.e., identified during the process of FIG. 2). NVS1 204 comprises a chunk index database for tape cartridge 4711. A subsequent process is executed for writing contents of NVS1 204 and NVS2 208 to a specified location at a beginning portion of tape cartridge 4711.

Figure 4:
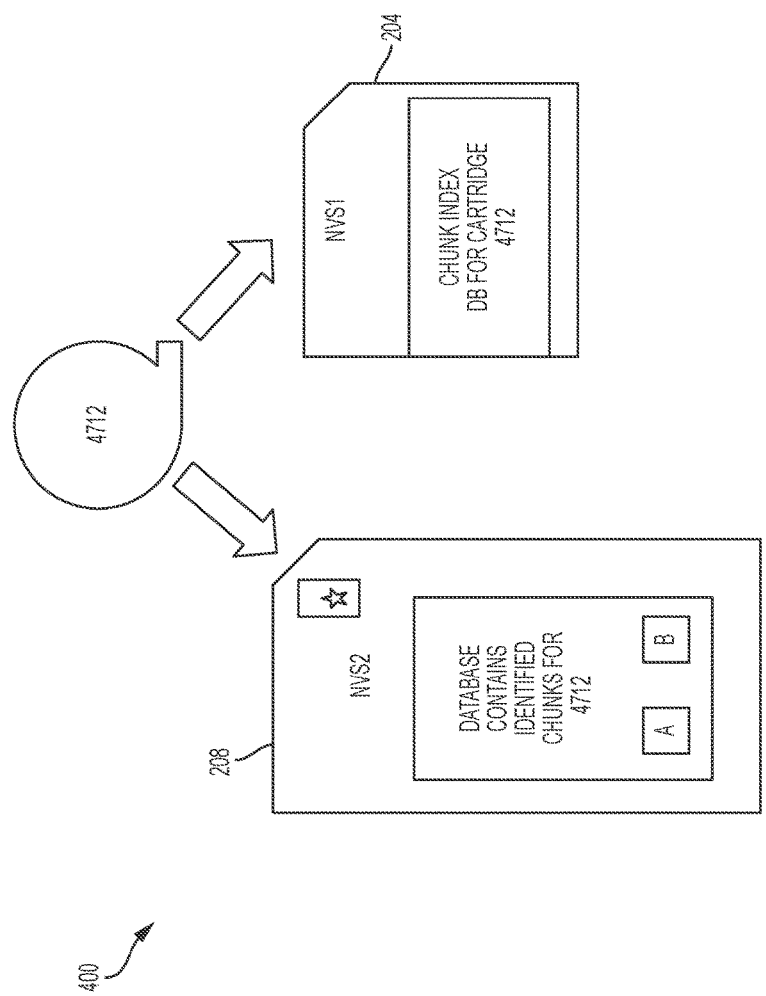
FIG. 4 illustrates a process for reading deduplicated data from a tape cartridge via internal non-volatile memory devices, in accordance with embodiments of the present invention.

FIG. 4 illustrates a process 400 for reading deduplicated data from a tape cartridge 4712 via NVS1 204 and NVS2 208, in accordance with embodiments of the present invention. Process 400 illustrates tape cartridge 4712 being mounted to a storage tape drive hardware device (e.g., storage tape drive hardware device 100 of FIG. 1) for executing a data read operation. A chunk database is read from tape cartridge 4712 to NVS2 208. An index database is read from tape cartridge 4712 to NVS1 204.

Figure 5:
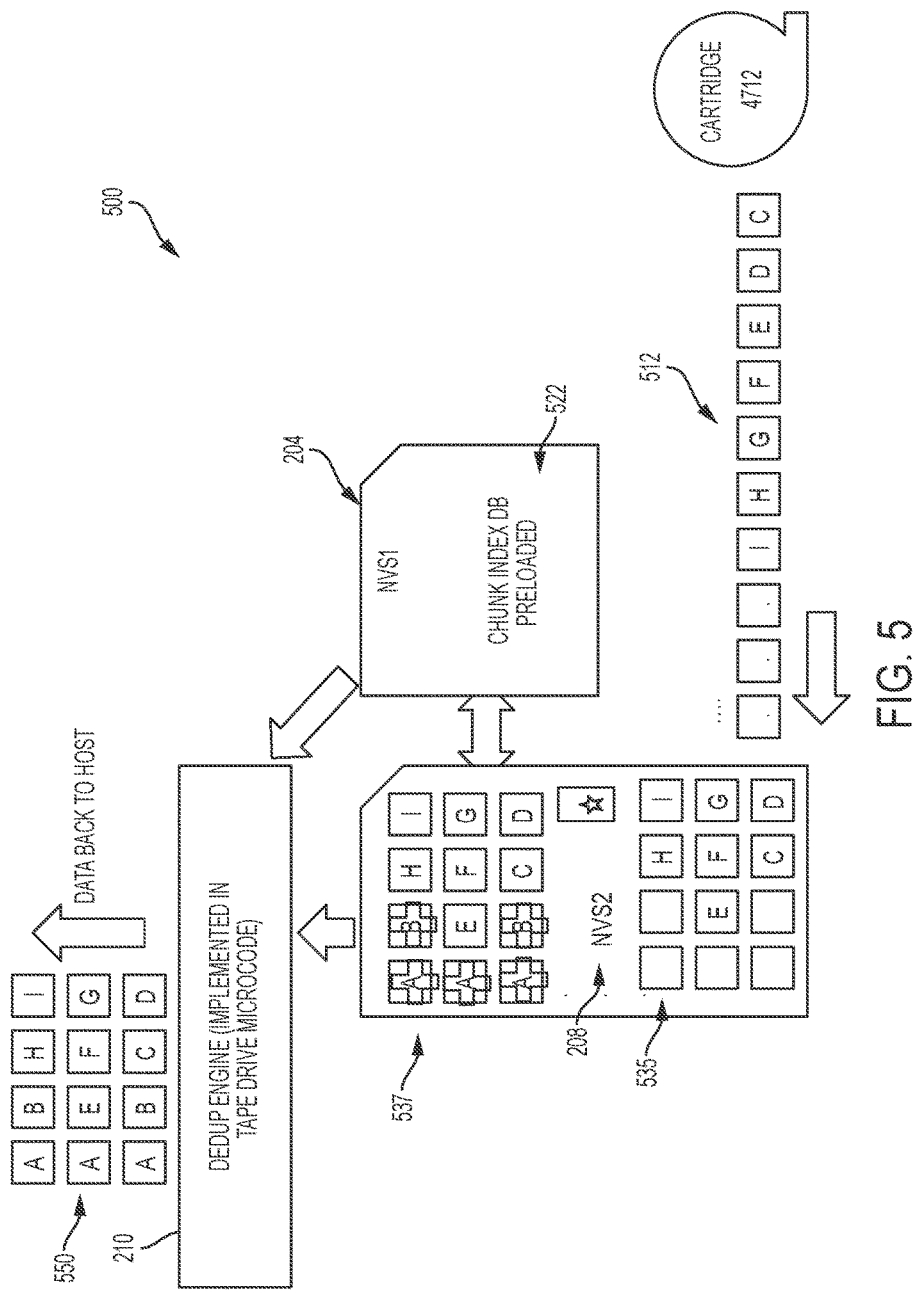
FIG. 5 illustrates a further process with respect to the process of FIG. 4, in accordance with embodiments of the present invention.

FIG. 5 illustrates a further process 500 with respect to process 400 of FIG. 4, in accordance with embodiments of the present invention. Process 500 illustrates reserve partition within NVS 204 preloaded with a chunk index database 522. The process is initiated when data chunks 512 are read back from tape cartridge 4712 to NVS2 208. Any gaps 535 (of data chunks 512) to be filled are identified and missing data chunks 537 are added to data chunks 512 based on information from the chunk index database 522 with respect to information from a reserved database of NVS2. Deduplication engine 210 transmits the complete data stream 550 back to a host device.

Figure 6:
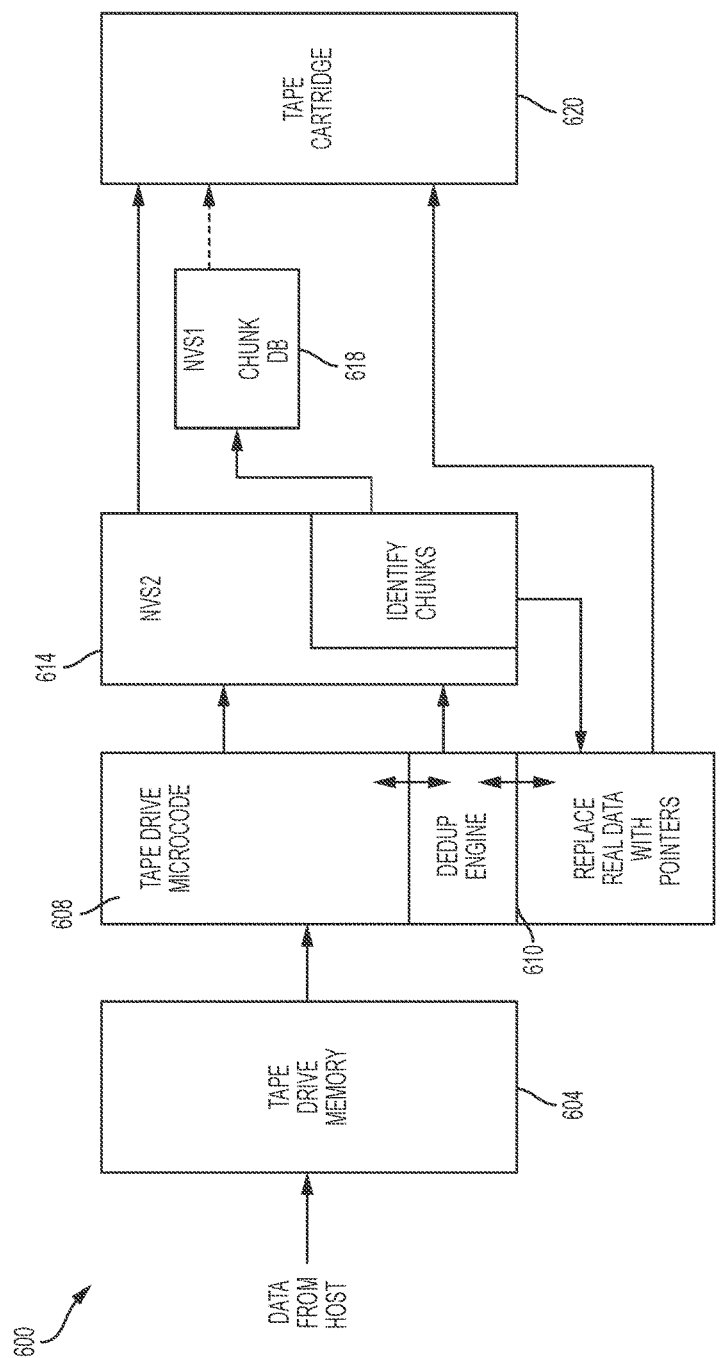
FIG. 6 illustrates a process executed within a storage tape drive hardware device, in accordance with embodiments of the present invention.

FIG. 6 illustrates a process executed within a storage tape drive hardware device 600, in accordance with embodiments of the present invention. Storage tape drive hardware device 600 comprises a tape drive memory unit 604 (comprising tape drive microcode 608 and a deduplication engine 610) connected to NVS2 614 and NVS1 618 for communications with a tape cartridge 620. The process is initiated when data is received (via tape drive memory 604) form a data host. Tape drive microcode 608 and deduplication engine 610 identify duplicate data chunks (within NVS2 614) and replace the duplicate data chunks with location pointers associated with NVS1 618. All remaining data chunks are stored within tape cartridge 620.

Figure 7:
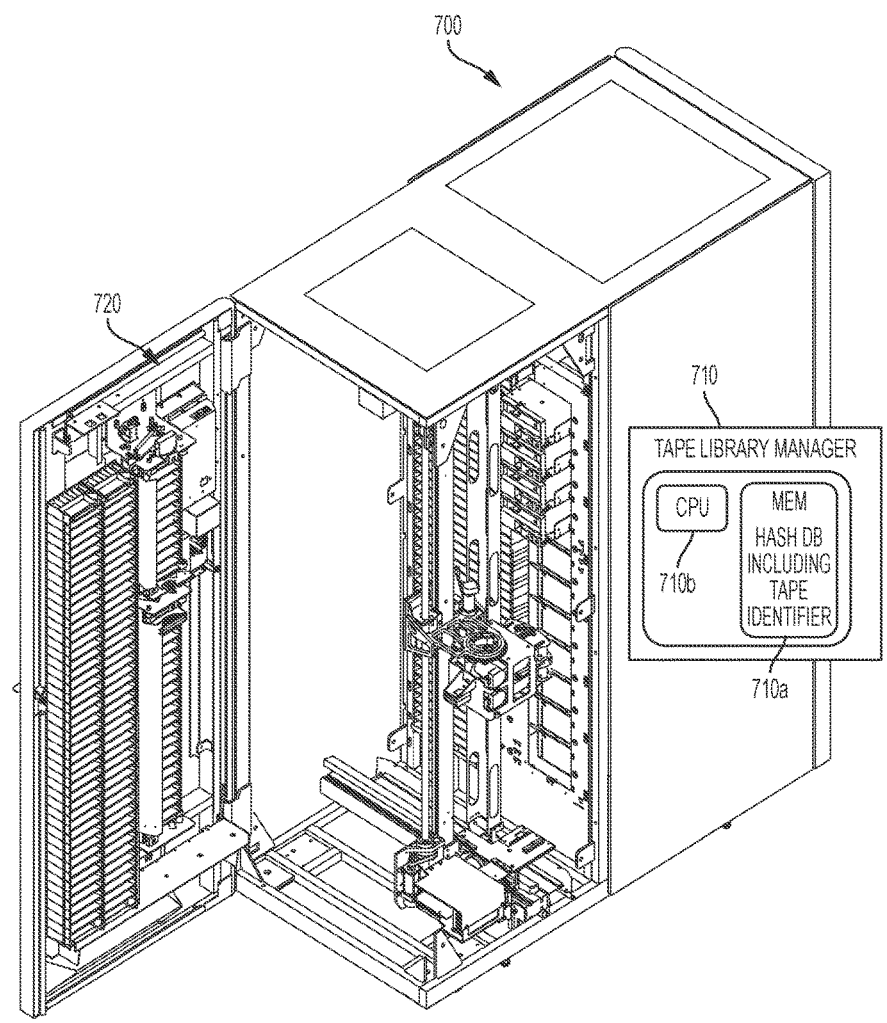
FIG. 7 illustrates a storage tape drive hardware library system for improving a tape drive memory storage process, in accordance with embodiments of the present invention.
Figure 8:
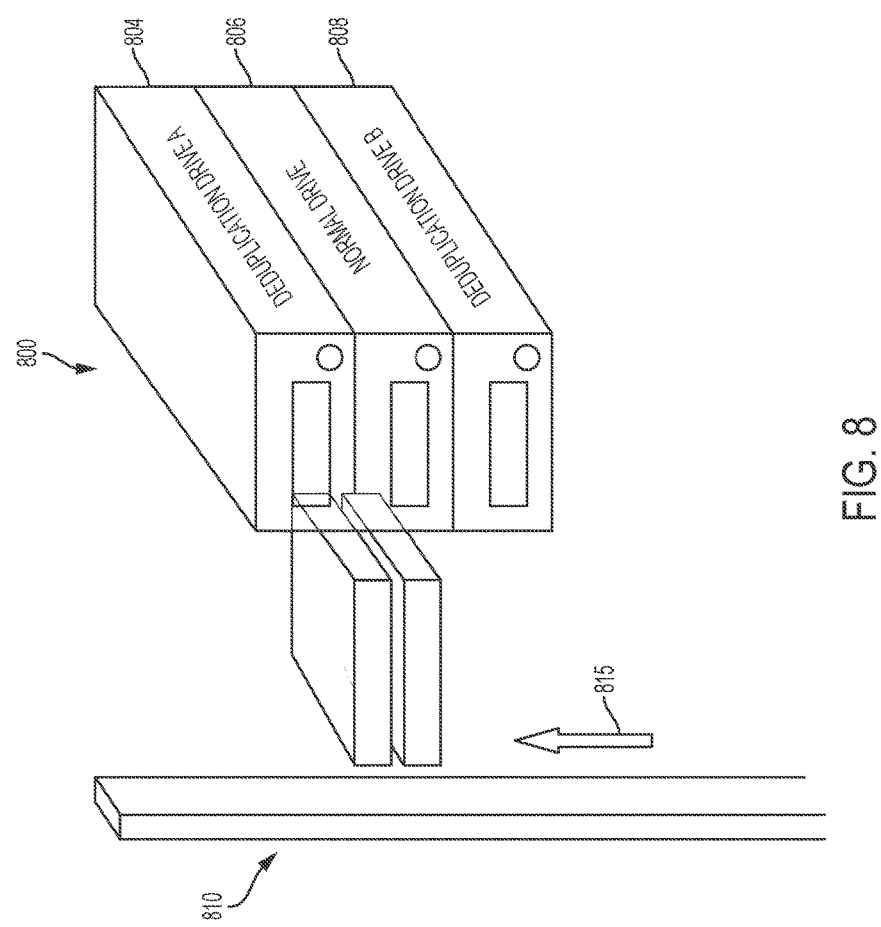
FIG. 8 illustrates a storage tape drive hardware library system comprising multiple storage tape drive hardware devices, in accordance with embodiments of the present invention.

FIG. 7 illustrates a storage tape drive hardware library system 700 for improving a tape drive memory storage process, in accordance with embodiments of the present invention. Storage tape drive hardware library system 700 integrates multiple storage tape drive hardware devices (e.g., as illustrated in FIG. 8, infra) for executing a deduplication process. Storage tape drive hardware library system 700 reduces/eliminates a data learning process of single storage tape drive hardware devices by sharing previously learned information with a tape library manager device and the integrated hardware devices thereby increasing a compression ratio by eliminating a learning curve resulting in a better fit with respect to top deduplication data chunks. Storage tape drive hardware library system 700 integrates an additional deduplication memory device 710a within a tape library manager device 710. Deduplication memory device 710a temporarily stores the most popular depuplicated hashes representing data chunks and associated data chunk populations. Data chunks are processed using a hash algorithm. Extra copies of the same data chunks are deleted thereby leaving only a single copy to be stored. Data is analyzed to identify duplicate byte patterns to ensure a single instance of a data chunk comprises a single data file. Duplicate data chunks are replaced with a reference that points to the stored chunks. Hash based data de-duplication methods in accordance with embodiments of the invention use a hashing algorithm to identify the chunks of data. When data is processed via a hashing algorithm, a hash is created that represents the data. A hash comprises a bit string (e.g., 128 bits) that represents the data being processed. If the same date has been processed through the hashing algorithm multiple times, the same hash is calculated each time thereby indicating that the data are the same.

Each new empty tape (upon mounting to storage tape drive hardware library system 700) will request the most popular depuplicated hashes from tape library manager 710. The most popular depuplicated hashes are used to initiate a deduplication process with respect to an empty tape thereby eliminating a learning curve. Each previously used tape compares and synchronizes current data with the requested most popular depuplicated hashes from tape library manager 710. Each tape being unmounted (from storage tape drive hardware library system 700) will synchronize additionally learned deduplications with tape library manager 710 to further update storage tape drive hardware library system 700 with the most popular depuplicated hashes.

Storage tape drive hardware library system 700 of FIG. 7 includes an electro/mechanical structure 720 (for placement of storage tape hardware devices) and a tape library manager 710 comprising a manager non-volatile memory device (MNVS) 710a and a CPU 710b. The electro/mechanical structure 720 comprises mechanical structures (e.g., motors, springs, drive mechanisms, retainer hardware, column structure, etc.) and electrical circuitry (integrated circuits, switches, etc.) for controlling placement of storage tape hardware devices. MNVS 104 may comprise any type of specialized memory devices including, inter alia, an integrated circuit based memory device, a removable flash memory device, etc. MNVS 104 comprises a hash database including a tape cartridge identifier. Storage tape drive hardware library system 700 may comprise an embedded computer or any type of specialized embedded hardware device. An embedded computer is defined herein as a dedicated computer comprising a combination of computer hardware and software (fixed in capability or programmable) specifically designed for executing a specialized function. Programmable embedded computers may comprise specialized programming interfaces. Additionally, storage tape drive hardware library system 700 may comprise a specialized hardware device comprising specialized (non-generic) hardware and circuitry (i.e., specialized discrete non-generic analog, digital, and logic based circuitry) for executing a process described with respect to FIGS. 7-18. The specialized discrete non-generic analog, digital, and logic based circuitry may include proprietary specially designed components (e.g., a specialized integrated circuit designed for only implementing an automated process for improving tape drive memory storage process). Storage tape drive hardware library system 700 includes specialized memory devices MNVS 710a. The specialized memory may include a single memory system. Alternatively, the specialized memory may include a plurality of memory systems. Storage tape drive hardware library system 700 may include sensors, processors, and additional software and specialized circuitry. Sensors may include, inter alia, storage sensors, optical sensors, speed sensors, etc.

FIG. 8 illustrates a storage tape drive hardware library system 800 comprising multiple storage tape drive hardware devices, in accordance with embodiments of the present invention. Storage tape drive hardware library system comprises a deduplication storage tape drive hardware device 804 and a deduplication storage tape drive hardware device 808 placed adjacent to a standard storage tape drive hardware device 806 within storage tape drive hardware library system 800. A picker assembly 810 is configured to move in a direction 815 to place tape cartridges within deduplication storage tape drive hardware device 804, deduplication storage tape drive hardware device 808, and/or standard storage tape drive hardware device 806.

Figure 9:
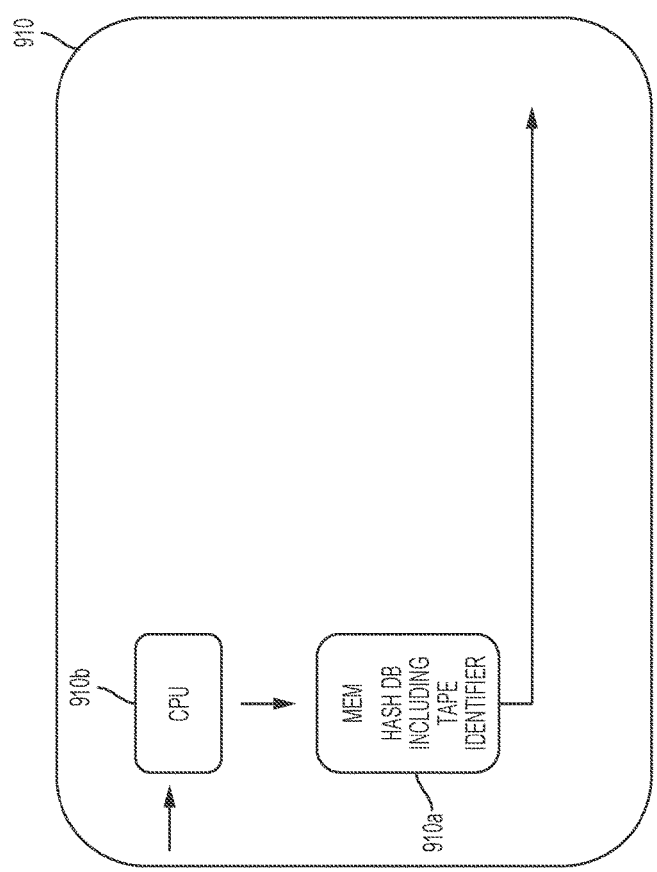
FIG. 9 illustrates a detailed view of a tape library manager, in accordance with embodiments of the present invention.

FIG. 9 illustrates a detailed view of a tape library manager 910, in accordance with embodiments of the present invention. Tape library manager 910 comprises a manager non-volatile memory device (MNVS) 910a and a CPU 910b. CPU 910b creates a hash database (within MNVS 910a), merges new data into the hash database, and merges any removed storage tape cartridge data including drive tape identification. Tape library manager 910 is connected to a storage tape drive hardware device(s) via an Ethernet connection. During a storage tape cartridge removal process, contents of a hash database (of the associated storage tape drive hardware device) are copied to the storage tape cartridge. If the data chunks are determined to be corrupt, then alternative data chunks associated with the hash data are requested from the tape library manager 910. In response, tape library manager 910 will transmit the requested alternative data chunks.

Figure 10:
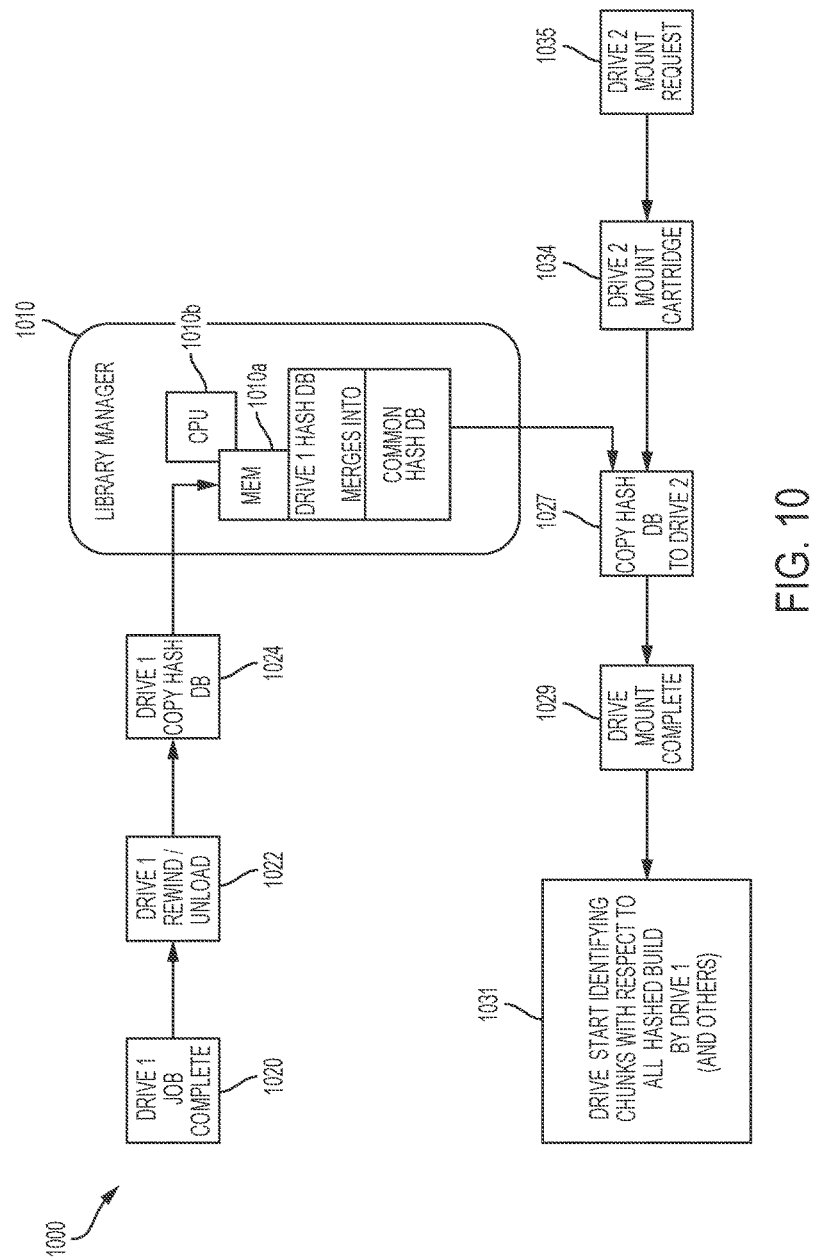
FIG. 10 illustrates an operational algorithm detailing a process flow enabled by the system of FIG. 1 for executing a hash database enabled process, in accordance with embodiments of the present invention.

FIG. 10 illustrates an operational algorithm detailing a process flow enabled by system 100 of FIG. 1 for executing a hash database enabled process, in accordance with embodiments of the present invention. The process is initiated when a drive 1 (i.e., storage tape drive hardware device) has completed a job 1020 and performs a rewind/unload process 1022 with respect to the storage tape cartridge. Subsequently, a hash database 1010a generated during a last job is copied 1024 via an Ethernet interface to the tape library manager 1010. In response, tape library manager 1010 merges the hash data coming from drive 1 into the common hash data base of MNVS 1010a. Subsequently, a drive 2 (i.e., storage tape drive hardware device) receives a mount request 1035 and the storage tape cartridge requested is mounted 1034. A request is initiated with respect to the tape library manager 1010 for the common hash database comprising hashes located by the drive 1. In response, the common hash data base is copied 1027 to the drive 2 and it is reported to host as drive mount complete 1029 thereby indicating that the drive 2 is ready for a job to start. The drive 2 will now be equipped with all hashes from the common data base and identifies all associated data chunks 1031.

Figure 11:
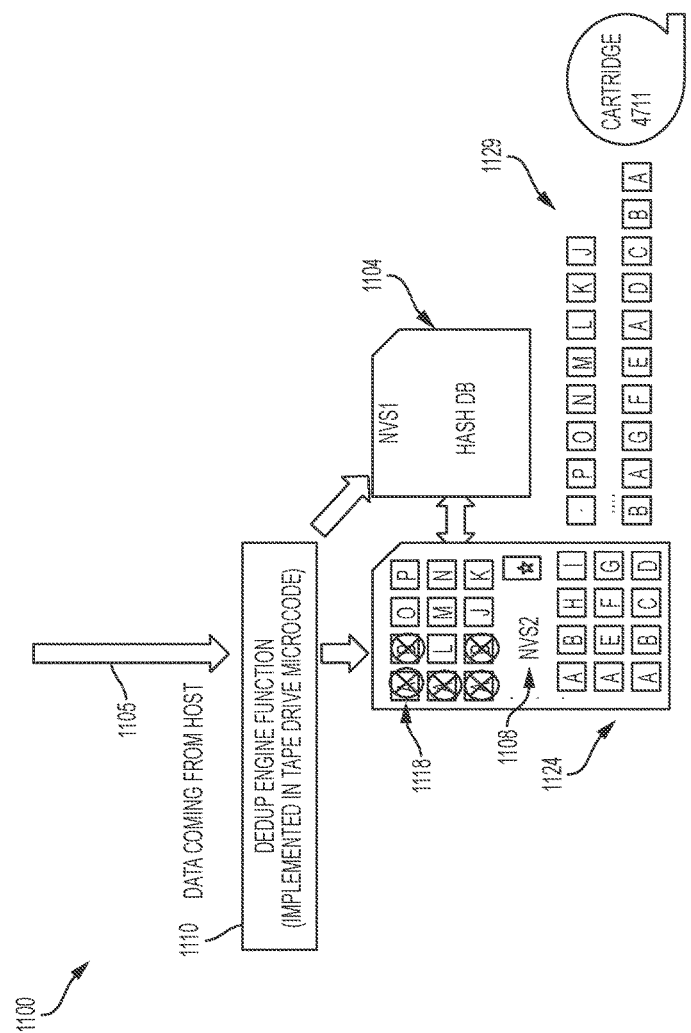
FIG. 11 illustrates a process for deduplicating and writing data via an NVS1 and an NVS2 1108, in accordance with embodiments of the present invention.

FIG. 11 illustrates a process 1100 for deduplicating and writing data via NVS1 1104 (comprising a hash database) and NVS2 1108, in accordance with embodiments of the present invention. Process 1100 illustrates a data stream 1105 received from a data host device. Data stream 1105 is processed (within NVS2 1108) by a deduplication software engine 1110 (comprising software microcode) resulting in the deletion of data chunks "A" and "B" from NVS2 1108. Additionally, a position pointer associated with the remaining data chunks 1118 (being stored within tape cartridge 4711) is stored within the hash database within NVS1 1104. A subsequent analysis is performed to analyze the incoming data stream 1124 until a specified number (i.e., a threshold) of duplicate data chunks are identified. For example (with respect to FIG. 11), data chunk "A" has been identified three times and data chunk "B" has been identified two times. All remaining data chunks 1129 are written to tape cartridge 4711. Additionally, during a tape cartridge mount process, the chunk database is copied from a tape library manager to NVS1.

Figure 12:
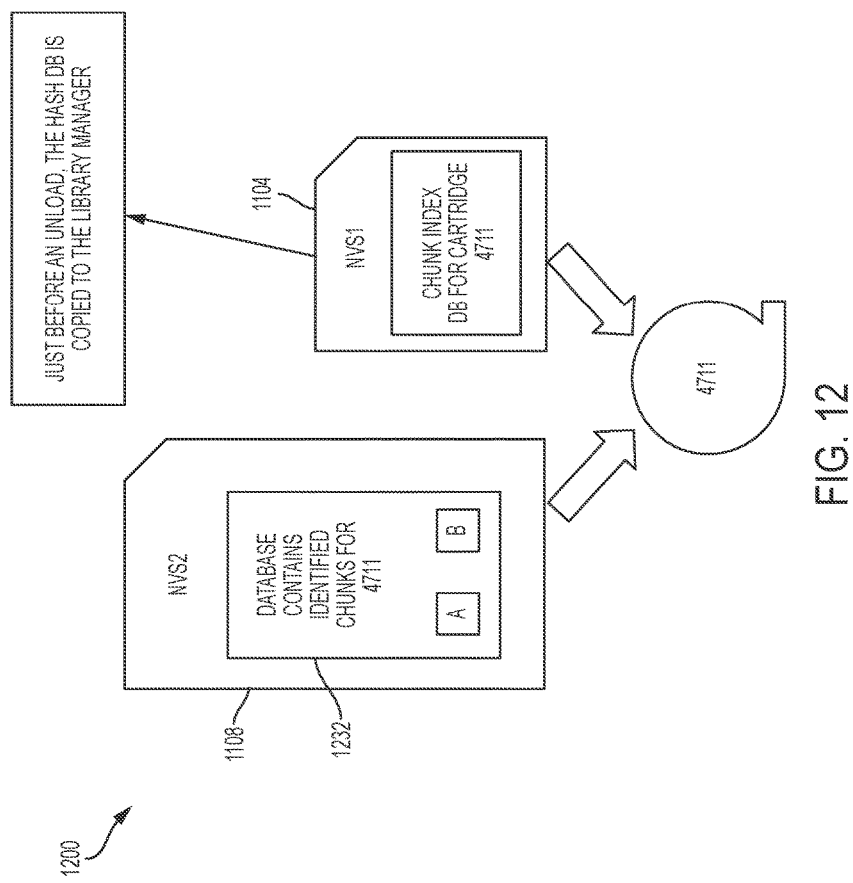
FIG. 12 illustrates a further process with respect to the process of FIG. 11, in accordance with embodiments of the present invention.

FIG. 12 illustrates a further process 1200 with respect to process 1100 of FIG. 11, in accordance with embodiments of the present invention. Process 1200 illustrates a reserve partition 1232 within NVS2. Reserve partition 1232 includes a database comprising all identified duplicate data chunks "A" and "B" (i.e., identified during the process of FIG. 11). NVS1 1104 comprises a hash database for tape cartridge 4711. A subsequent process is executed for writing contents of NVS1 1104 and NVS2 1108 to a specified location at a beginning portion of tape cartridge 4711. Additionally, the hash databased is copied to a tape library manager.

Figure 13:
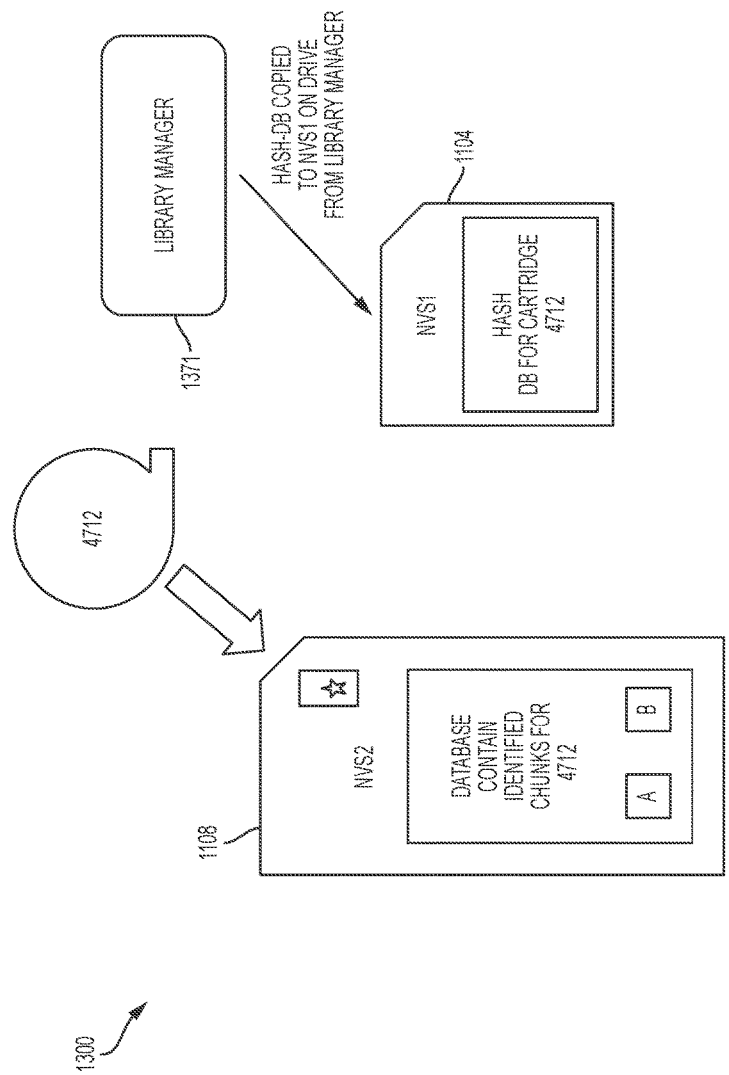
FIG. 13 illustrates a process for reading deduplicated data from a tape cartridge via an NVS1 and an NVS2, in accordance with embodiments of the present invention.

FIG. 13 illustrates a process 1300 for reading deduplicated data from a tape cartridge 4712 via NVS1 1104 and NVS2 1108, in accordance with embodiments of the present invention. Process 1300 illustrates tape cartridge 4712 being mounted to a storage tape drive hardware device (e.g., storage tape drive hardware device 100 of FIG. 1) for executing a data read operation. A chunk database is read from tape cartridge 4712 to NVS2 1108. A hash database is read from a library manger device 1371 to NVS1 1104.

Figure 14:
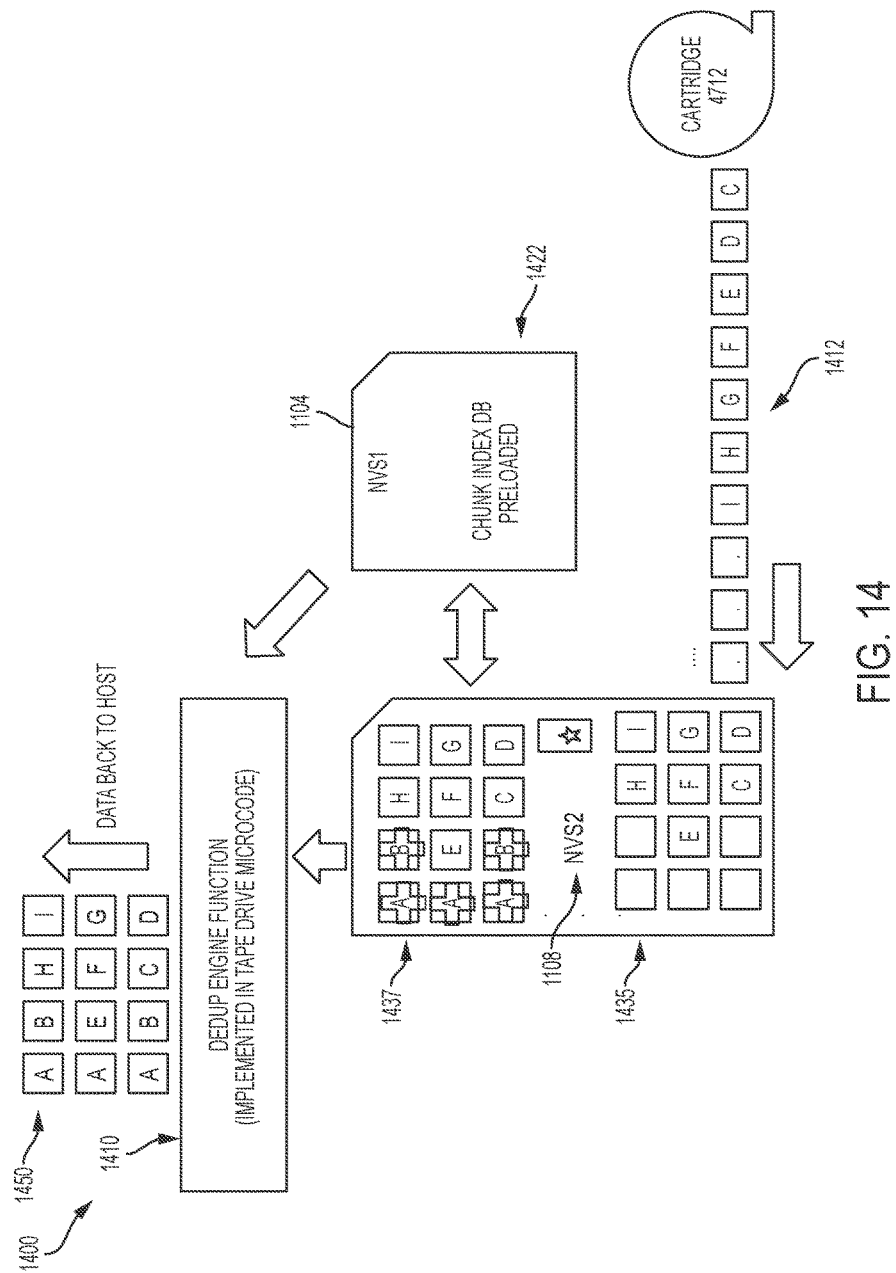
FIG. 14 illustrates a further process with respect to the process of FIG. 13, in accordance with embodiments of the present invention.

FIG. 14 illustrates a further process 1400 with respect to process 1300 of FIG. 13, in accordance with embodiments of the present invention. Process 1400 illustrates reserve partition within NVS1 1108 preloaded with a hash database 1422. The process is initiated when data chunks 1412 are read back from tape cartridge 4712 to NVS2 1108. Any gaps 1435 (of data chunks 1412) to be filled are identified and missing data chunks 1437 are added to data chunks 1412 based on information from the chunk index database 1422 with respect to information from a reserved database of NVS2 1108. Deduplication engine 1410 transmits the complete data stream 1450 back to a host device.

Figure 15:
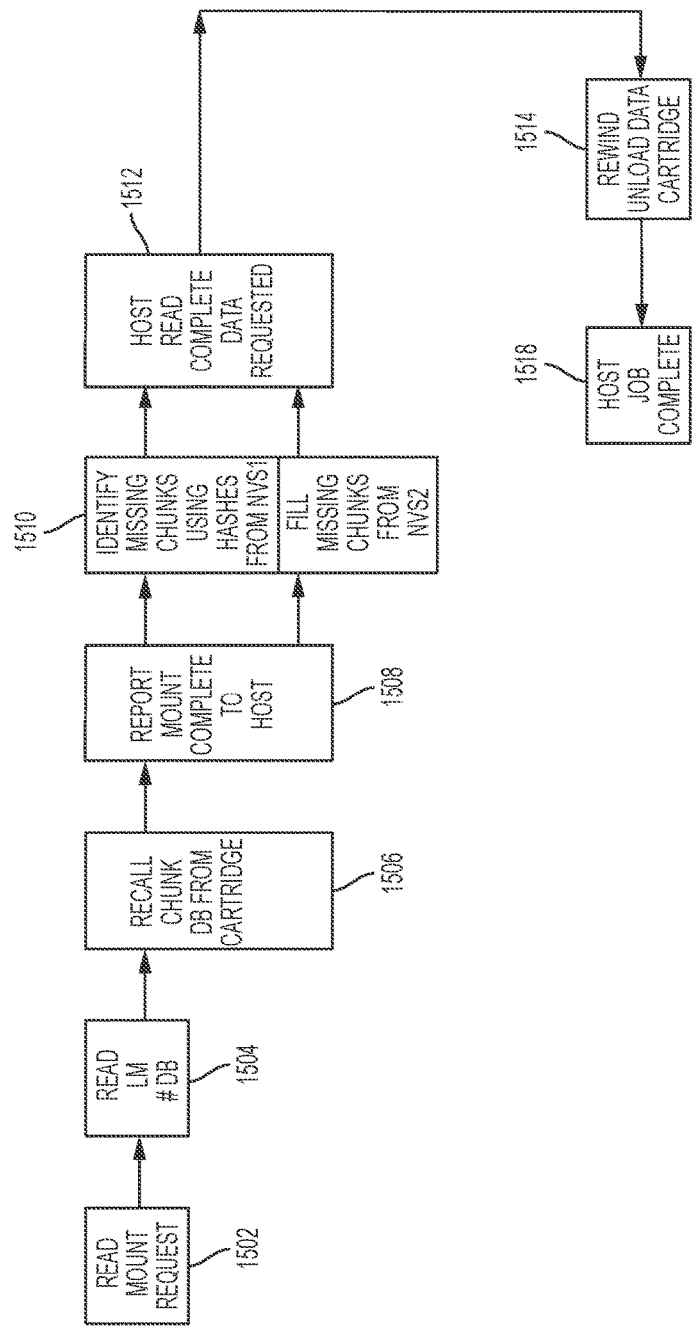
FIG. 15 illustrates a process identifying missing data chunks, in accordance with embodiments of the present invention.

FIG. 15 illustrates a process identifying missing data chunks, in accordance with embodiments of the present invention. In step 1502, a storage tape cartridge mount request is read. In step 1504, a library manager database is read. In step 1506, a chunk database is recalled from a storage tape cartridge. In step 1508, a mount complete indicator (for the mounted storage tape cartridge) is reported to a data host device. In step 1510, missing data chunks are identified using hashes from an NVS1 and the missing data chunks are replaced from an NVS2. In step 1512, a host data complete indicator is requested. In step 1514, the storage tape cartridge is rewound and unloaded from an associated drive device. In step 1518, the host job is completed.

Figure 16:
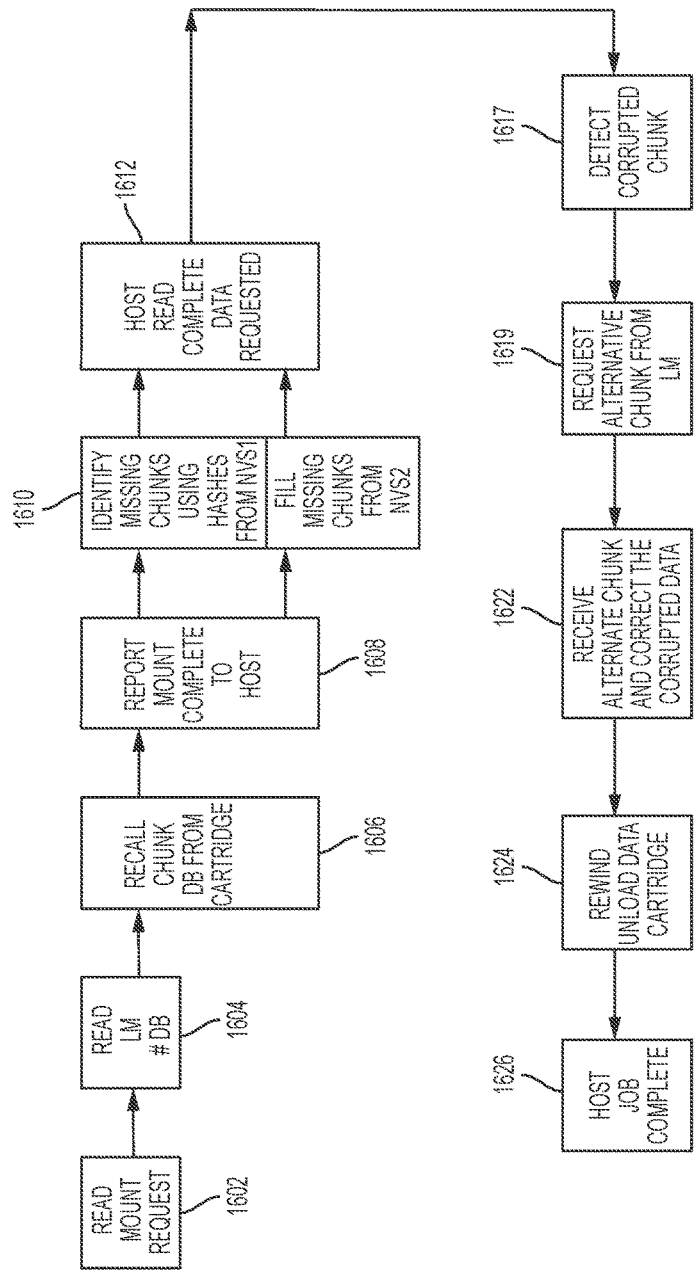
FIG. 16 illustrates a process identifying corrupt data chunks, in accordance with embodiments of the present invention.

FIG. 16 illustrates a process identifying corrupt data chunks, in accordance with embodiments of the present invention. In step 1602, a storage tape cartridge mount request is read. In step 1604, a library manager database is read. In step 1606, a chunk database is recalled from a storage tape cartridge. In step 1608, a mount complete indicator (for the mounted storage tape cartridge) is reported to a data host device. In step 1610, missing data chunks are identified using hashes from an NVS1 and the missing data chunks are replaced from an NVS2. In step 1612, a host data complete indicator is requested. In step 1617, a corrupt data chunk is detected. In step 1619, an alternative data chunk is requested from a library manager device. In step 1622, the alternative data chunk is received and used to replace the corrupt data chunk. In step 1624, the storage tape cartridge is rewound and unloaded from an associated drive device. In step 1626, the host job is completed.

Figure 17:
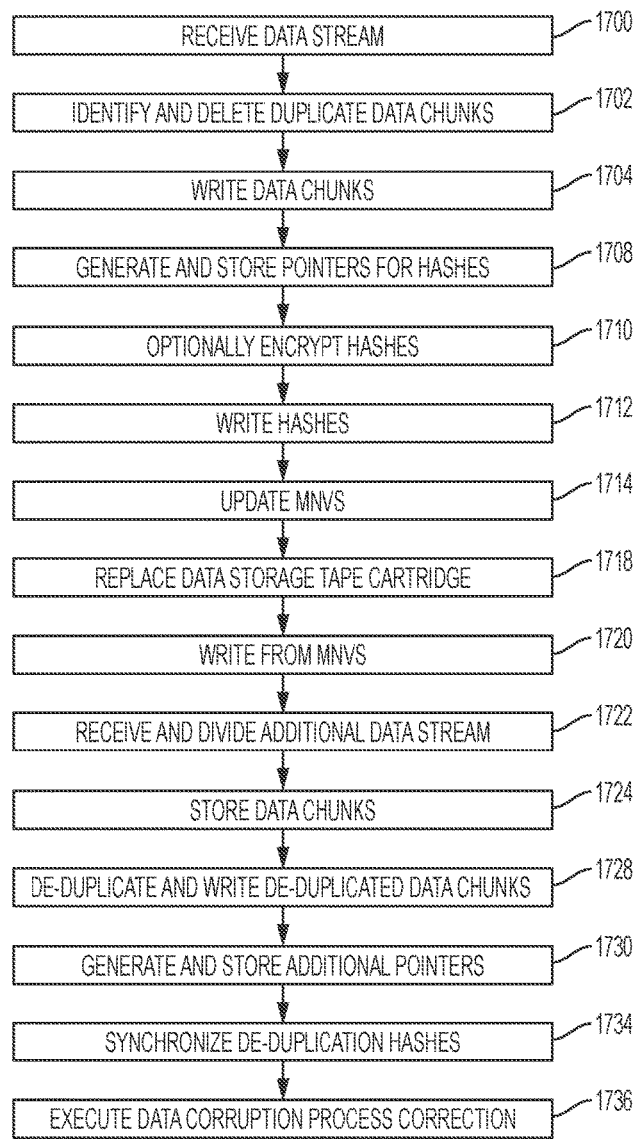
FIG. 17 illustrates an algorithm detailing a process flow enabled by the system of FIG. 1 for improving tape drive memory storage via execution of an internal data deduplication process, in accordance with embodiments of the present invention.

FIG. 17 illustrates an algorithm detailing a process flow enabled by system 100 of FIG. 1 for improving tape drive memory storage via execution of an internal data deduplication process, in accordance with embodiments of the present invention. Each of the steps in the algorithm of FIG. 17 may be enabled and executed in any order by a computer processor(s) executing computer code. In step 1700, a data stream is received (by a storage tape drive hardware device of a hardware library system including a plurality of storage tape drive hardware devices) for storage. The storage tape drive hardware device internally comprises a deduplication software engine, a first non-volatile memory device (NVS1), a second non-volatile memory device (NVS2), and a first data storage tape cartridge. The data stream is stored within NVS2. NVS1 and NVS2 may comprise integrated circuit based memory devices. In step 1702, duplicate data chunks of a plurality of adjacent variable length data chunks of the data stream are identified within NVS2. The duplicate data chunks include duplicated data with respect to a group of data chunks of the plurality of adjacent variable length data chunks. The duplicate data chunks are deleted from NVS2 such that the group of data chunks remains within NVS2. In step 1704, the group of data chunks is written to a first data storage tape cartridge of the storage tape drive hardware device. In step 1708, pointers are generated. The pointers are associated with a location within NVS1 for storing de-duplication hashes identifying each data chunk of the group of data chunks stored within the first data storage tape cartridge. The pointers are stored within the first data storage tape cartridge. In step 1712, the de-duplication hashes are written from the NVS1 to a manager non-volatile memory device (MNVS) of the storage tape drive hardware library system. In step 1714, the MNVS is updated by combining the de-duplication hashes with a plurality of additional de-duplication hashes identifying a plurality of commonly used de-duplicated data chunks stored within the plurality of storage tape drive hardware devices. In step 1718, first data storage tape cartridge is removed from the storage tape drive hardware device and a second data storage tape cartridge is placed within a second storage tape drive hardware device of the plurality of storage tape drive hardware devices. In step 1720, the de-duplication hashes combined with the plurality of additional de-duplication hashes are written from the MNVS to an additional NVS1 of the second storage tape drive hardware device. In step 1722, an additional data stream is received for storage. The additional data stream is divided into a second plurality of adjacent variable length data chunks. In step 1724, the second plurality of adjacent variable length data chunks are stored within an additional NVS2 of the second storage tape drive hardware device. In step 1728, the second plurality of adjacent variable length data chunks are de-duplicated (based on the de-duplication hashes combined with the plurality of additional de-duplication hashes) such that a second group of de-duplicated data chunks remain within the additional NVS2. The second group of de-duplicated data chunks is written to the second data storage tape cartridge of the second storage tape drive hardware device. In step 1730, additional pointers are generated. The additional pointers are associated with a location within the additional NVS1 for storing the de-duplication hashes combined with the plurality of additional de-duplication hashes. The pointers are stored within the second data storage tape cartridge. In step 1734, all additional de-duplication hashes associated with all additional de-duplicated data chunks (processed by the plurality of storage tape drive hardware devices and the storage tape drive hardware library system) are synchronized with all de-duplication hashes within the MNVS such that the MNVS is updated with currently updated de-duplication hashes associated with currently updated de-duplicated data chunks. In step 1736, a data corruption correction process is executed. The data corruption correction process includes: (1) detecting corrupted data chunks stored within a storage tape drive hardware device of the plurality of storage tape drive hardware devices; (2) retrieving (from the MNVS) pointers associated with functional data chunks of at least one additional NVS2 of the plurality of storage tape drive hardware devices comprising data storage tape cartridges including the functional data chunks; and (3) replacing the corrupted data chunks with the functional data chunks.

Figure 18:
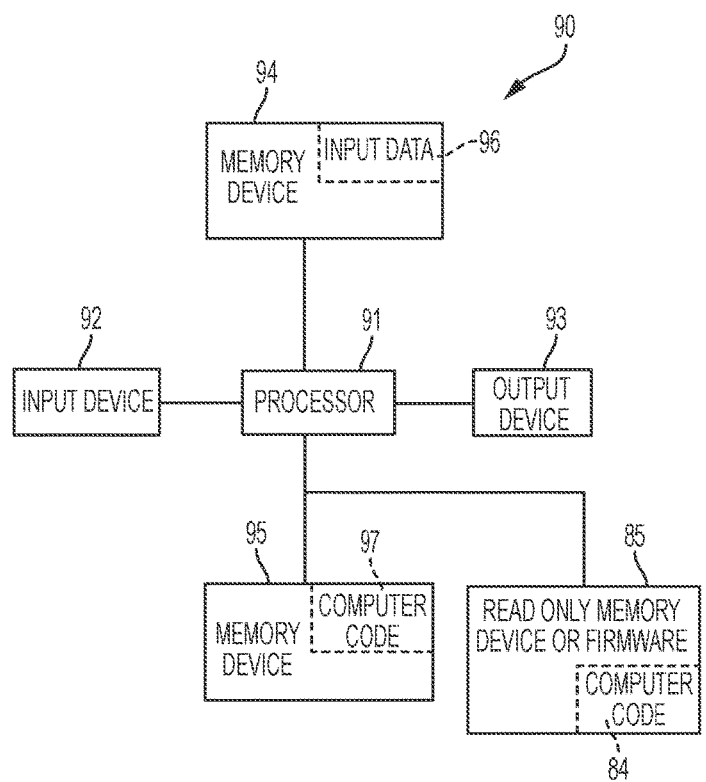
FIG. 18 illustrates a computer system used by or comprised by the system of FIG. 1 for improving a tape drive memory storage process, in accordance with embodiments of the present invention.

FIG. 18 illustrates a computer system 90 (e.g., the storage tape drive hardware device of FIG. 1 or the tape library manager system of FIG. 7) used by or comprised by the system of FIGS. 1 and 7 for improving a tape drive memory storage process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 18 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital media disc (DVD), a dynamic random access memory (DRAM), a read-only memory (ROM), etc. The memory device 95 includes a computer code 97. The computer code 97 includes algorithms (e.g., the algorithms of FIGS. 10 and 15-17) for enabling a process for improving a tape drive memory storage process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 10 and 15-17) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a tape drive memory storage process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving a tape drive memory storage process. In another embodiment, the invention provides a business method that performs the process steps of the invention on a subscription, advertising, and/or fee basis. That is, a service supplier, such as a Solution Integrator, could offer to enable a process for improving a tape drive memory storage process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 18 shows the computer system 90 as a particular configuration of hardware and software, any configuration of hardware and software, as would be known to a person of ordinary skill in the art, may be utilized for the purposes stated supra in conjunction with the particular computer system 90 of FIG. 18. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A tape drive memory storage improvement method comprising:

receiving, by a processor of a storage tape drive hardware device of a storage tape drive hardware library system comprising a plurality of storage tape drive hardware devices, a data stream for storage, wherein said storage tape drive hardware device internally comprises a deduplication software engine, a non-volatile memory device (NVS1), a non-volatile memory device (NVS2), and a first data storage tape cartridge;

identifying, by said processor within said NVS2, duplicate data chunks of a plurality of adjacent variable length data chunks of said data stream, wherein said duplicate data chunks comprise duplicated data with respect to a first group of data chunks of said plurality of adjacent variable length data chunks;

deleting, by said processor from said NVS2, said duplicate data chunks such that said first group of data chunks remain within said NVS2;

writing, by said processor to a first data storage tape cartridge of said storage tape drive hardware device, said first group of data chunks;

generating, by said processor, pointers associated with a location within said NVS1 storing de-duplication hashes identifying each data chunk of said first group of data chunks stored within said first data storage tape cartridge;

storing, by said processor, said pointers within said first data storage tape cartridge;

writing, by said processor from said NVS1 to a manager non-volatile memory device (MNVS) of said storage tape drive hardware library system, said de-duplication hashes; and updating, by said processor, said MNVS by combining said de-duplication hashes with a plurality of additional de-duplication hashes identifying a plurality of commonly used de-duplicated data chunks stored within said plurality of storage tape drive hardware devices.

2. The method of claim 1, wherein said first data storage tape cartridge is removed from said storage tape drive hardware device, wherein a second data storage tape cartridge is placed within a second storage tape drive hardware device of said plurality of storage tape drive hardware devices, and wherein said method further comprises:

writing, from said MNVS to an additional NVS1 of said second storage tape drive hardware device, said de-duplication hashes combined with said plurality of additional de-duplication hashes;

receiving an additional data stream for storage;

dividing said additional data stream into a second plurality of adjacent variable length data chunks;

storing, within an additional NVS2 of said second storage tape drive hardware device, said second plurality of adjacent variable length data chunks;

de-duplicating, based on said de-duplication hashes combined with said plurality of additional de-duplication hashes, said second plurality of adjacent variable length data chunks such that a second group of de-duplicated data chunks remain within said additional NVS2;

writing, by said processor to said second data storage tape cartridge of said second storage tape drive hardware device, said second group of de-duplicated data chunks;

generating, by said processor, additional pointers associated with a location within said additional NVS1 storing said de-duplication hashes combined with said plurality of additional de-duplication hashes; and storing, by said processor, said pointers within said second data storage tape cartridge.

3. The method of claim 2, wherein said storage tape drive hardware library system further comprises a communication component, and wherein said method further comprises:

synchronizing with all de-duplication hashes within said MNVS, via said communication component, all additional de-duplication hashes associated with all additional de-duplicated data chunks processed by said plurality of storage tape drive hardware devices and said storage tape drive hardware library system such that said MNVS is updated with currently updated de-duplication hashes associated with currently updated de-duplicated data chunks.

4. The method of claim 2, further comprising:

detecting corrupted data chunks stored within a storage tape drive hardware device of said plurality of storage tape drive hardware devices;

retrieving, from said MNVS, pointers associated with functional data chunks of at least one additional NVS2 of said plurality of storage tape drive hardware devices comprising data storage tape cartridges including said functional data chunks;

replacing said corrupted data chunks with said functional data chunks.

5. The method of claim 1, further comprising:

providing an Ethernet connection between said MNVS and said plurality of storage tape drive hardware devices.

6. The method of claim 1, wherein said MNVS comprises a memory device selected from the group consisting of an integrated circuit based memory device and a removable flash memory device.

7. The method of claim 1, wherein said MNVS comprises a hash database.

8. The method of claim 1, further comprising:

encrypting, by said processor, all hashes within said MNVS.

9. The method of claim 1, further comprising:

providing at least one support service for at least one of creating, integrating, hosting, maintaining, and deploying computer-readable code in the storage tape drive hardware device, said code being executed by the processor to implement: said receiving, said identifying, said deleting, said writing said first group of data chunks, said generating said pointers, said storing said pointers, said writing said de-duplication hashes, and said updating.

10. A computer program product, comprising a computer readable hardware storage device storing a computer readable program code, said computer readable program code comprising an algorithm that when executed by a processor of a storage tape drive hardware device implements a tape drive memory storage improvement method, said method comprising:

receiving, by said processor, a data stream for storage, wherein said storage tape drive hardware device is comprised by a storage tape drive hardware library system comprising a plurality of storage tape drive hardware devices, and wherein said storage tape drive hardware device internally comprises a deduplication software engine, a non-volatile memory device (NVS1), a non-volatile memory device (NVS2), and a first data storage tape cartridge;

identifying, by said processor within said NVS2, duplicate data chunks of a plurality of adjacent variable length data chunks of said data stream, wherein said duplicate data chunks comprise duplicated data with respect to a first group of data chunks of said plurality of adjacent variable length data chunks;

deleting, by said processor from said NVS2, said duplicate data chunks such that said first group of data chunks remain within said NVS2;

writing, by said processor to a first data storage tape cartridge of said storage tape drive hardware device, said first group of data chunks;

generating, by said processor, pointers associated with a location within said NVS1 storing de-duplication hashes identifying each data chunk of said first group of data chunks stored within said first data storage tape cartridge;

storing, by said processor, said pointers within said first data storage tape cartridge;

writing, by said processor from said NVS1 to a manager non-volatile memory device (MNVS) of said storage tape drive hardware library system, said de-duplication hashes; and updating, by said processor, said MNVS by combining said de-duplication hashes with a plurality of additional de-duplication hashes identifying a plurality of commonly used de-duplicated data chunks stored within said plurality of storage tape drive hardware devices.

11. The computer program product of claim 10, wherein said first data storage tape cartridge is removed from said storage tape drive hardware device, wherein a second data storage tape cartridge is placed within a second storage tape drive hardware device of said plurality of storage tape drive hardware devices, and wherein said method further comprises:
  writing, from said MNVS to an additional NVS1 of said second storage tape drive hardware device, said de-duplication hashes combined with said plurality of additional de-duplication hashes;
  receiving an additional data stream for storage;
  dividing said additional data stream into a second plurality of adjacent variable length data chunks;
  storing, within an additional NVS2 of said second storage tape drive hardware device, said second plurality of adjacent variable length data chunks;
  de-duplicating, based on said de-duplication hashes combined with said plurality of additional de-duplication hashes, said second plurality of adjacent variable length data chunks such that a second group of de-duplicated data chunks remain within said additional NVS2;
  writing, by said processor to said second data storage tape cartridge of said second storage tape drive hardware device, said second group of de-duplicated data chunks;
  generating, by said processor, additional pointers associated with a location within said additional NVS1 storing said de-duplication hashes combined with said plurality of additional de-duplication hashes; and
  storing, by said processor, said pointers within said second data storage tape cartridge.

12. The computer program product of claim 11, wherein said storage tape drive hardware library system further comprises a communication component, and wherein said method further comprises:
  synchronizing with all de-duplication hashes within said MNVS, via said communication component, all additional de-duplication hashes associated with all additional de-duplicated data chunks processed by said plurality of storage tape drive hardware devices and said storage tape drive hardware library system such that said MNVS is updated with currently updated de-duplication hashes associated with currently updated de-duplicated data chunks.

13. The computer program product of claim 11, wherein said method further comprises:
  detecting corrupted data chunks stored within a storage tape drive hardware device of said plurality of storage tape drive hardware devices;
  retrieving, from said MNVS, pointers associated with functional data chunks of at least one additional NVS2 of said plurality of storage tape drive hardware devices comprising data storage tape cartridges including said functional data chunks;
  replacing said corrupted data chunks with said functional data chunks.

14. The computer program product of claim 10, wherein said method further comprises:
  providing an Ethernet connection between said MNVS and said plurality of storage tape drive hardware devices.

15. The computer program product of claim 10, wherein said MNVS comprises a memory device selected from the group consisting of an integrated circuit based memory device and a removable flash memory device.

16. The computer program product of claim 10, wherein said MNVS comprises a hash database.

17. The computer program product of claim 10, further comprising:
  encrypting, by said processor, all hashes within said MNVS.

18. A storage tape drive hardware device comprising a processor coupled to a computer-readable memory unit, said memory unit comprising instructions that when executed by the processor implements a tape drive memory storage improvement method comprising:
  receiving, by said processor, a data stream for storage, wherein said storage tape drive hardware device is comprised by a storage tape drive hardware library system comprising a plurality of storage tape drive hardware devices, and wherein said storage tape drive hardware device internally comprises a deduplication software engine, a non-volatile memory device (NVS1), a non-volatile memory device (NVS2), and a first data storage tape cartridge;
  identifying, by said processor within said NVS2, duplicate data chunks of a plurality of adjacent variable length data chunks of said data stream, wherein said duplicate data chunks comprise duplicated data with respect to a first group of data chunks of said plurality of adjacent variable length data chunks;
  deleting, by said processor from said NVS2, said duplicate data chunks such that said first group of data chunks remain within said NVS2;
  writing, by said processor to a first data storage tape cartridge of said storage tape drive hardware device, said first group of data chunks;
  generating, by said processor, pointers associated with a location within said NVS1 storing de-duplication hashes identifying each data chunk of said first group of data chunks stored within said first data storage tape cartridge;
  storing, by said processor, said pointers within said first data storage tape cartridge;
  writing, by said processor from said NVS1 to a manager non-volatile memory device (MNVS) of said storage tape drive hardware library system, said de-duplication hashes; and
  updating, by said processor, said MNVS by combining said de-duplication hashes with a plurality of additional de-duplication hashes identifying a plurality of commonly used de-duplicated data chunks stored within said plurality of storage tape drive hardware devices.

19. The storage tape drive hardware device of claim 18, wherein said first data storage tape cartridge is removed from said storage tape drive hardware device, wherein a second data storage tape cartridge is placed within a second storage tape drive hardware device of said plurality of storage tape drive hardware devices, and wherein said method further comprises:
  writing, from said MNVS to an additional NVS1 of said second storage tape drive hardware device, said de-duplication hashes combined with said plurality of additional de-duplication hashes;
  receiving an additional data stream for storage;
  dividing said additional data stream into a second plurality of adjacent variable length data chunks;
  storing, within an additional NVS2 of said second storage tape drive hardware device, said second plurality of adjacent variable length data chunks;

de-duplicating, based on said de-duplication hashes combined with said plurality of additional de-duplication hashes, said second plurality of adjacent variable length data chunks such that a second group of de-duplicated data chunks remain within said additional NVS2;

writing, by said processor to said second data storage tape cartridge of said second storage tape drive hardware device, said second group of de-duplicated data chunks;

generating, by said processor, additional pointers associated with a location within said additional NVS1 storing said de-duplication hashes combined with said plurality of additional de-duplication hashes; and storing, by said processor, said pointers within said second data storage tape cartridge.

20. The storage tape drive hardware device of claim 19, wherein said storage tape drive hardware library system further comprises a communication component, and wherein said method further comprises:

synchronizing with all de-duplication hashes within said MNVS, via said communication component, all additional de-duplication hashes associated with all additional de-duplicated data chunks processed by said plurality of storage tape drive hardware devices and said storage tape drive hardware library system such that said MNVS is updated with currently updated de-duplication hashes associated with currently updated de-duplicated data chunks.

* * * * *